US012768467B2

(12) United States Patent
Noble

(10) Patent No.: US 12,768,467 B2
(45) Date of Patent: Oct. 20, 2026

(54) VALVE POSITION MONITORING APPARATUS AND METHOD

(71) Applicant: Asahi/America, Inc., Lawrence, MA (US)

(72) Inventor: Julia Noble, Somerville, MA (US)

(73) Assignee: Asahi/America, Inc., Lawrence, MA (US)

( * ) Notice: Subject to any disclaimer, the term of this patent is extended or adjusted under 35 U.S.C. 154(b) by 73 days.

(21) Appl. No.: 18/610,419

(22) Filed: Mar. 20, 2024

(65) Prior Publication Data

US 2024/0392888 A1 Nov. 28, 2024

Related U.S. Application Data

(60) Provisional application No. 63/468,367, filed on May 23, 2023.

(51) Int. Cl.
*F16K 37/00* (2006.01)
*F16K 31/60* (2006.01)

(52) U.S. Cl.
CPC .......... *F16K 37/0033* (2013.01); *F16K 31/60* (2013.01)

(58) Field of Classification Search
CPC ............................ F16K 37/0033; F16K 31/60
See application file for complete search history.

(56) References Cited

U.S. PATENT DOCUMENTS 4,459,531 A 7/1984 Dumont et al.
4,663,601 A * 5/1987 Troutman ........... F16K 37/0041 324/207.13
8,789,807 B2 * 7/2014 Kreuter ................. F16K 31/055 251/293
9,605,599 B2 * 3/2017 Lindström ............ F02D 11/106
2004/0099833 A1 * 5/2004 Haikawa ............... F16K 31/041 251/292
2012/0193558 A1 8/2012 Hoots et al.
2012/0211688 A1 * 8/2012 Carlson .................. F16K 27/00 251/291
2013/0206258 A1 * 8/2013 Duboy ................. G01D 11/245 137/553
2020/0003327 A1 * 1/2020 Karber .................. F16K 5/0647

FOREIGN PATENT DOCUMENTS

DE 10 2005 042 701 3/2007

* cited by examiner

*Primary Examiner* — Angelisa L. Hicks
(74) *Attorney, Agent, or Firm* — Gerald E. Hespos; Michael J. Porco

(57) ABSTRACT

A valve monitoring apparatus is provided for a manual valve that has a valve housing, a valve stem with a mounting portion projecting out of the valve housing and a valve handle mounted removably to the mounting portion of the valve stem. The apparatus has a valve stem extension with opposite first and second ends spaced apart along a rotational axis of the valve stem extension. The first end of the valve stem extension removably and non-rotatably engages the mounting portion of the valve stem upon removal of the valve handle from the valve stem so that rotation of the valve stem extension rotates the valve stem. A switch housing releasably mounted to the valve housing so that the switch housing is radially outward from the valve stem extension. A sensing apparatus is disposed in the switch housing and senses at least one rotational position of the valve stem extension.

19 Claims, 9 Drawing Sheets

VALVE POSITION MONITORING APPARATUS AND METHOD

CROSS REFERENCE TO RELATED APPLICATION

This application claims priority to U.S. Provisional Patent Appl. No. 63/468,367, filed May 23, 2023, the entire disclosure of which is incorporated herein by reference.

BACKGROUND

Field of the Invention

The invention relates to an apparatus for monitoring the opened/closed position of a manually operable valve and to a method for installing the apparatus on a valve.

Description of the Related Art

Commercially available two-way ball valves typically include a valve housing with first and second diametrically aligned passageways that communicate with one another and connect respectively to inlet and outlet pipes. A spherical valving element is mounted rotatably within the valve housing at a position between the first and second passageways. A valve stem extends rigidly from the valving element and passes through the valve body in a sealed manner. Rotational forces applied to a portion of the valve stem external of the valve body will cause a corresponding rotation of the valving element within the valve body. The valving element of a two-way ball valve has a first and second diametrically aligned cylindrical passages extending through the valving element. These passages through the valving element of a two-way ball valve permit fluid flow between the first and second passageways of the valve housing when the valving element is in a first rotational position but block fluid flow when the valving element is in a second rotational position. The first and second rotational positions normally are separated from one another by about 90°.

The prior art also includes three-way ball valves. The housing of a three-way ball valve has first and second diametrically aligned passageways and also has a third passageway. The third passageway in the housing of a three-way ball valve is orthogonal to the first and second passageways and communicates with the first and second passageways. The spherical valving element of a three-way ball valve has either two perpendicularly intersecting ports (an L port design) or three intersecting ports (a T port design). The spherical valving element can enable fluid communication between two or three of the passages in the valve housing depending on the rotational orientation of the spherical valving element in the valve housing.

A butterfly valve has a disk-shaped valving element and the valve stem is coincident with a diameter of the disc. Fluid flows on opposite sides of the disc-shaped valving element when the butterfly valve is opened rather than through the cylindrical passages of a ball valve when the ball valve is opened.

Some valves used in industry have electric or pneumatic actuators mounted to the exterior of the valve housing. The actuator includes a motor connected electronically to a control system. Signals from the control system operate a switch connected to the actuator and cause the actuator to rotate the valve stem. Signals from the control system may synchronize the opening and closing of valves throughout a system to carry out a particular manufacturing or chemical process.

Many other valves are operated manually. A manual valve has a handle mounted to the valve stem so that the handle extends transverse to the rotational axis of the valve stem. Forces exerted manually on the handle cause the valve stem to rotate and move the valving element between the open and closed positions. Manual valves are much less expensive than electrically or pneumatically actuated valves. Accordingly, manual valves generally will be preferred by a customer if there is no need for frequent synchronized operation of many valves in an industrial facility.

There are many times when the operator of an industrial facility will want assurance of the opened or closed position of at least certain valves of a piping system even though automatic actuation of the valves is not necessary. In other instances, a remote contractor may want an ability to monitor valves of a system, such as a system of a customer, for purposes of trouble-shooting before or instead of having to send a field engineer to a site. In an effort to meet this consumer interest, some commercially available manual valves include electric switch assemblies that can be connected into an electric system for producing one or more signals indicative of whether the valve is opened or closed. A problem with this approach is that a consumer may recognize a need for an indication of whether a valve is opened or closed after the piping system is in place and operating. Accordingly, some manual valves can be retrofitted with switches that will produce a signal indicative of the opened or closed state of the valve. However, commercially available switch systems that can be retrofitted onto an existing valve of an existing system require tools to be used in a fairly complicated disassembly of the existing valve followed by a further use of tools in a complex reassembly with a multipart switch system. Another approach is to provide a kit with many parts (e.g. 10-12 parts) that must be assembled around the existing valve in a complex procedure that requires tools. The technician who is performing this retrofitting typically is familiar with operating fluid systems but is not likely to be familiar with assembling an electromechanical apparatus. Additionally, these retrofitted switch systems can identify the fully opened or fully closed condition of the valve, but are not capable of identifying any intermediate position of the valving element.

A complete replacement of the existing valve with a valve that has an opened/closed monitoring capability also is an option but requires at least part of the piping system to be shut down while an existing valve is removed and replaced by a valve that has a switch system to identify the opened or closed state of the valve.

Accordingly, an object of the invention is to provide a kit comprising a valve and a switching system that can be assembled with one another and incorporated into a piping system for identifying the opened or closed state of the valving element without requiring a significant disassembly and reassembly of the valve.

Another object of the invention is to provide a switching apparatus that can be mounted to one or more valves of a piping system to identify the opened or closed state of one or more valves in the piping system.

A further object of the invention is to provide a method for mounting a switching apparatus to a valve of an existing piping system for identifying a rotational position of a valving element of the valve.

SUMMARY OF THE INVENTION

A first aspect of the invention relates to an assembly or kit that comprises a valve and a switch apparatus that can be assembled with the valve for identifying at least one of an open or closed position of the valve. The valve and the switch apparatus can be sold separately or as parts of a kit. The valve includes a valve housing or body with an inlet for connection to an inlet pipe, an outlet for connection to an outlet pipe and a flow passage extending between the inlet and outlet. The valve body may be formed from a thermoplastic material selected to ensure compatibility with a fluid flowing through the valve. For example, the valve body may be formed from polyvinylchloride (PVC), chlorinated polyvinylchloride (CPVC), polypropylene (PP) or polyvinylidene difluoride (PVDF) or other plastics. The switch apparatus also can be used with metal valves in certain situations.

The valve further includes a valving element mounted in the valve body at a position between the inlet and the outlet. The valve typically will be either a ball valve or a butterfly valve. As explained above, the valving element of a ball valve is a sphere with a cylindrical passage or passages extending through the sphere and alignable with passages of the valve body extending from the inlet to the outlet. The valving element of a butterfly valve is a solid disk. The description and illustrations that follow relate to an embodiment where the valve is a two-way ball valve. However, the invention is equally applicable to three-way ball valves, butterfly valves and other types of valves. The valving element is rotatable about an axis extending substantially perpendicular to an axial direction extending from the valve inlet to the valve outlet. A valve stem extends rigidly from the valving element and passes through the valve body in a sealed manner.

A manual handle is mounted removably to an end of the valve stem that projects out from the valve body. The handle has a grip that may be aligned perpendicular to the rotational axis of the valve stem. The removable connection of the handle to the valve stem may be achieved by frictional engagement and/or by a single screw extending through the handle and engaged in the outer end of the valve stem.

The switch apparatus of the assembly or kit includes a valve stem extension that can be mounted to the valve stem after the valve handle has been removed from the valve stem. One end of the valve stem extension can be provided with a receptacle that is configured to be engaged frictionally on the end of the valve stem that projects from the valve housing so that rotational forces applied to the valve stem extension are transferred to the valve stem for rotating the valve in the valve housing. No tools are required in this embodiment for connecting the valve stem extension to the valve stem. The properly mounted valve stem extension extends farther from the valve body than the valve stem. Additionally, the valve stem extension is mounted to the valve stem so that the valve stem extension rotates in unison with the valve stem about the axis of the valve stem. A position identifier is provided on the valve stem extension at a position spaced radially out from the rotational axis of the valve stem. In some embodiments, the position identifier is a magnet mounted in the valve stem extension at a position spaced outwardly from the rotational axis of the valve stem. The radially outward position of the magnet relative to the rotational axis of the valve stem and the valve stem extension causes the magnet to move through a circular arc as the valve stem and the valve stem extension rotate. The position identifier can take other forms. For example, a marking that can be read by an optical sensor can be provided on the valve stem extension at a position outward from the rotational axis. Alternatively, a projection that can be sensed by a mechanical switch can project radial out from the valve stem extension.

The switch apparatus further includes a switch housing assembly that is mountable to the valve after the valve handle has been removed but before the stem extension has been mounted. The switch housing assembly of some embodiments is comprised of a switch platform, a switch cover opposed to the switch platform and a continuous peripheral side wall extending between the switch platform and the switch cover. The switch platform, the switch cover and the peripheral side wall may be formed from plastic, particularly in those embodiments where the position identifier of the valve stem extension comprises a magnet. The switch platform is the part of the switch housing assembly that faces toward the valve body when the switch housing assembly is mounted to the valve. The switch platform has a valve stem opening configured to register with the valve stem of the valve. Locations on the switch platform outward of the valve stem opening may include resiliently deflectable engagement fingers for engaging regions of the valve housing radially outward of the valve stem. Thus, the switch platform can be snapped into engagement with the valve housing without using tools merely by moving the switch housing assembly linearly toward the valve body in a direction parallel to the valve stem. The peripheral side wall of the switch housing assembly includes an outwardly concave region spaced outward from the valve stem opening of the switch platform. The switch cover may have a shape that generally conforms to the shape defined by the peripheral side wall so that the switch cover can cover the end of the side wall opposite the switch platform. A seal is sealingly engaged between the switch cover and the open end of the peripheral side wall of the switch housing assembly.

The switching housing assembly further includes an inner plate that is mounted in the space enclosed by the peripheral side wall of the switch housing assembly and between the switch platform and the switch cover. The inner plate of some embodiments includes two sensor holders projecting in a direction away from the switch platform and toward the switch cover of the switch housing assembly. Proximity sensors, such as reed switches, are mounted respectively in the sensor holders and project into positions on opposite sides of the concave region formed by the peripheral side wall of the switch housing assembly. Other types of switches or proximity sensors can be provided in place of the reed switches. For example, Hall effect sensors can be mounted inward of the peripheral side wall of the switch housing assembly. Alternatively, optical sensors can be provided to detect a marking on the valve stem extension. Contact switches can be used in some embodiments to physically detect a projection on the valve stem extension. Optical sensors or contact switches may be suitable for metal valves. However, optical sensors and contact switches would be more difficult to protect from moisture or debris and may be less desirable than sensors that rely on magnetic attraction. Wires are connected respectively to the sensors and extend from the sensors through a sealed opening in the peripheral side wall of the switch housing assembly. Ends of the wires remote from the reed sensors can be connected to a monitoring circuit for detecting the position of the valving member as explained herein.

The assembly is used simply by removing the valve handle from the valve, and mounting the switch housing assembly to the valve body so that the valve stem opening in the switch platform registers with and surrounds the valve stem of the valve. The switch housing assembly includes all of the electronic components of the entire assembly sealed in the switch housing assembly. No tools are required. Rather the switch housing assembly merely is pushed linearly onto the valve housing and achieves a snapped connection with the valve housing. The valve stem extension then is telescoped onto the outer end of the valve stem from which the valve handle had been removed. The engagement of the valve stem extension with the outer end of the valve stem can be completed without using tools. The valve handle that previously was removed from the valve stem then is mounted to the end of the valve stem extension opposite the valve stem and is retained frictionally on the valve stem extension. Thus, rotational forces exerted on the valve handle will cause both the valve stem extension and the valve stem to rotate, thereby changing the valving member between the opened and closed positions depending upon the direction and magnitude of rotation. The assembly of the valve and the switch apparatus can be incorporated into a piping system that is under construction or that is being revised or expanded. The wires extending from the reed switches and through the sealed opening in the switch housing assembly are connected to appropriate monitoring circuitry.

Rotation of the valve handle will cause the valve stem extension and the valve stem to rotate in unison. This rotation of the valve stem extension will cause the magnet embedded in the valve stem extension to transcribe an arc that will position the magnet near one of the two reed switches (or other switches or sensors) depending upon the direction of rotation of the valve handle. Thus, one of the two reed switches will be triggered to produce a signal corresponding to either the opened position or the closed position of the valve.

The preceding description can be applied to the assembly of a valve with the switch apparatus to form an assembly that can be incorporated into a piping system that is under construction. However, the switch apparatus described above can be incorporated into an existing piping system without disassembling the valve, except for the simple manual temporary removal of the valve handle from the valve stem of the valve to which the switch apparatus will be mounted. Significantly, the mounting of the switch apparatus to the valve does not require any disassembly of the valve other than the temporary removal of the valve handle from the valve. No part of the piping system that incorporates the valve is required to be brought off-line during the mounting of the switch apparatus to the existing valve in the existing piping system. The switch apparatus also does not require assembly by the user. Rather, the preassembled switch housing assembly merely is positioned manually on the valve housing, and the valve stem extension is pushed onto the original valve stem of the valve.

DETAILED DESCRIPTION

Figure 2:
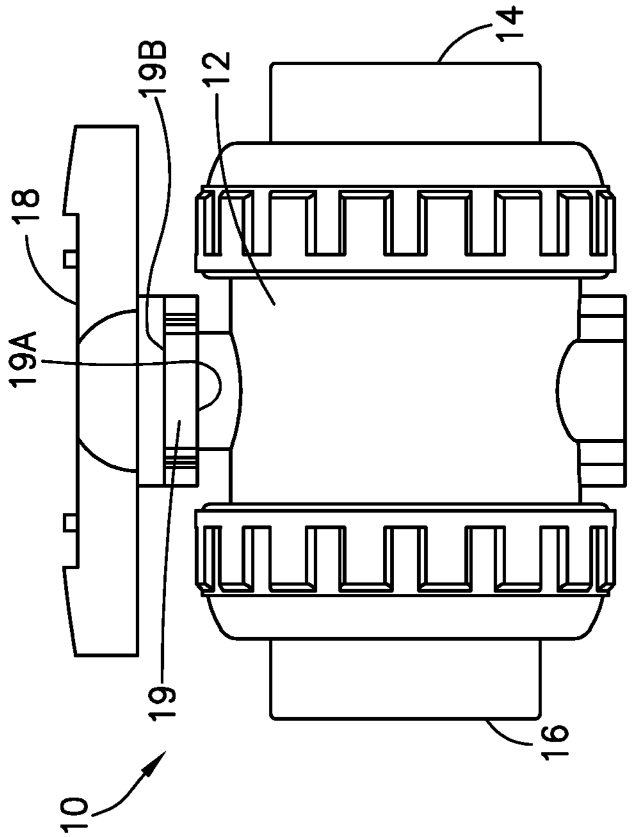
FIG.2 PRIOR ART
FIG. 2 is a side elevational view of the prior art ball valve shown in FIG. 1, but with the prior art handle mounted on and covering the valve stem.
Figure 1:
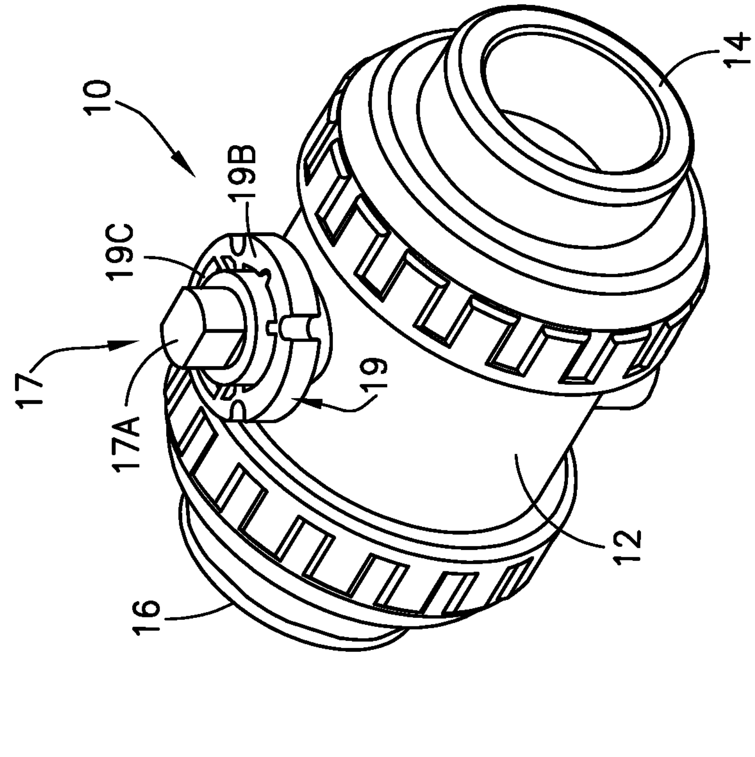
FIG.1 PRIOR ART
FIG. 1 is a perspective view of a prior art ball valve that can be incorporated into an assembly in accordance with one aspect of the invention, and with the handle of the prior art ball valve removed so that the valve stem is visible.

FIGS. 1 and 2 illustrate a prior art ball valve 10 that can be used as part of an assembly in accordance with one aspect of the invention. The ball valve 10 includes a valve body 12 having an inlet end 14 and an outlet end 16 that are spaced from one another along a valve axis. A spherical valving element is mounted in the valve body 12 and is connected to a valve stem 17 that projects through the valve body 12 in a sealing manner. The valve stem 17 and the valving element are rotatable about an axis that is perpendicular to the valve axis extending between the inlet 14 and the outlet 16. A valve handle 18 is mounted removably to the end 17A of the valve stem 17 remote from the valving element and, in this embodiment, is retained frictionally on the valve stem 17. Thus, in this embodiment, a pulling force on the valve handle 18 in a direction away from the valve body 12 will separate the valve handle 18 from the valve stem 17. The valve handle 18 can be rotated manually to rotate the valving element between an opened position that permits fluid flow through the valve body 12 from the inlet 14 to the outlet 16 and a closed position that blocks fluid flow through the valve body 12. The valve handle 18 can be mounted to and easily removed from the valve stem 17 without disassembling the valve 10. A flange 19 is part of the valve body 12 and surrounds a part of the valve stem 17. However, the free or upper end 17A of the valve stem 17 projects above the flange 19 and into a position that permits the valve handle 18 to be mounted on the end 17A of the valve stem 17 that projects beyond the flange 19. The flange 19 has a lower surface 19A and an upper surface 19B. The upper surface 19B of the flange 19 has a circularly generated track 19C that extends through an angle corresponding to a range of rotation for the valve handle 18 and the valve stem 17 to which the valve handle 18 is mounted. A projection on the lower surface of the valve handle 18 is engaged movably in the track 19C of the flange 19. The projection of the handle 18 will engage the opposite ends of the track 19C in the flange 19 for limiting the range of rotational movement of the handle 18 and hence the valve stem 17 and the valving element (e.g. about 90 degrees for most ball valves).

Figure 3:
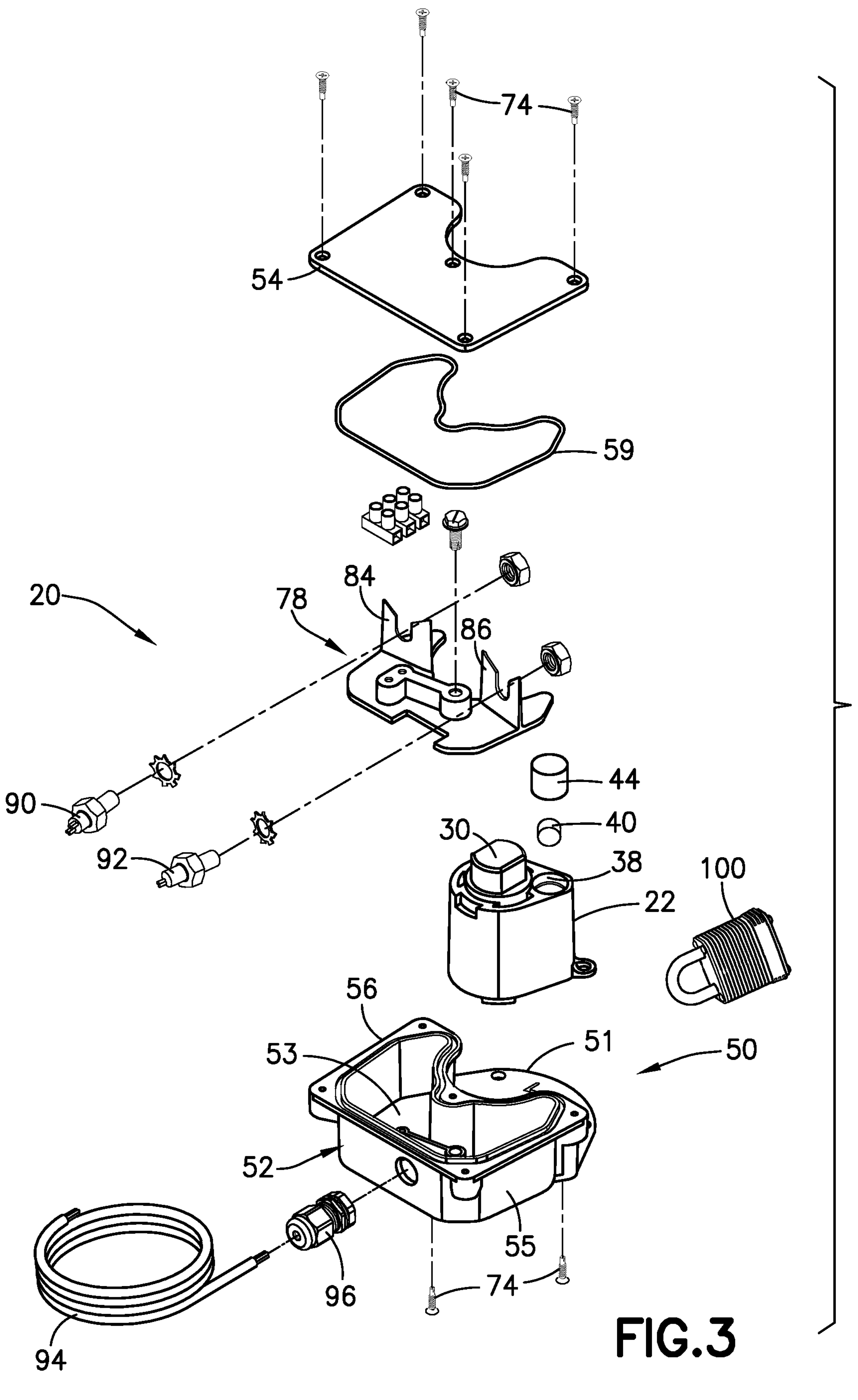
FIG. 3 is an exploded perspective view of a switch apparatus in accordance with an aspect of the invention and is suitable for combining with the valve shown in FIGS. 1 and 2.
Figure 5:
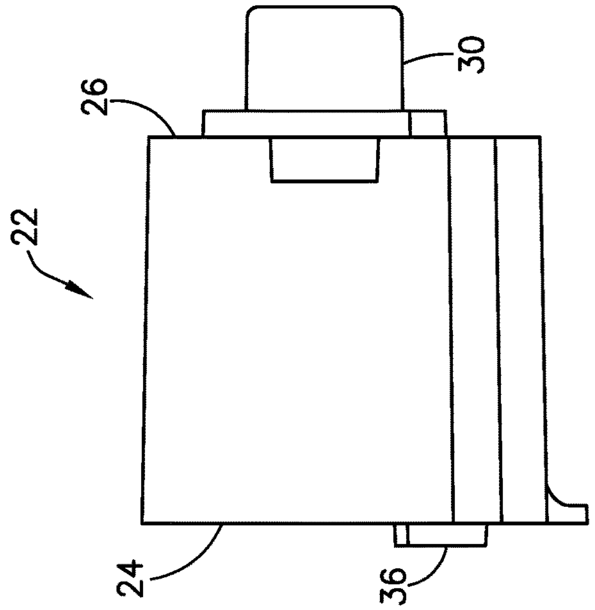
FIG. 5 is a side elevational view of the valve stem extension of FIGS. 14.
Figure 6:
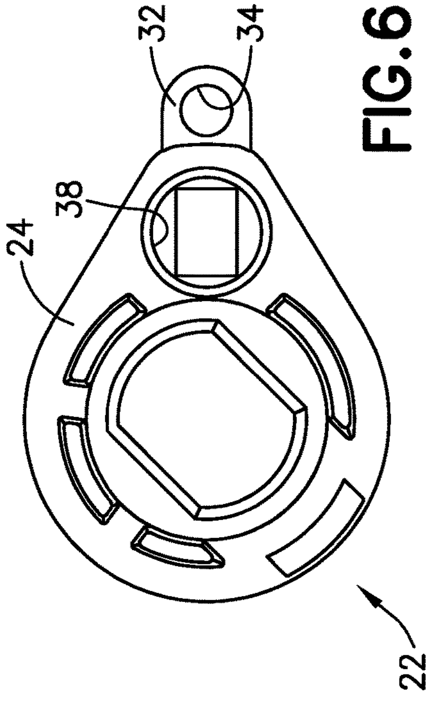
FIG. 6 is a top plan view of the valve stem extension of FIGS. 4 and 5.
Figure 4:
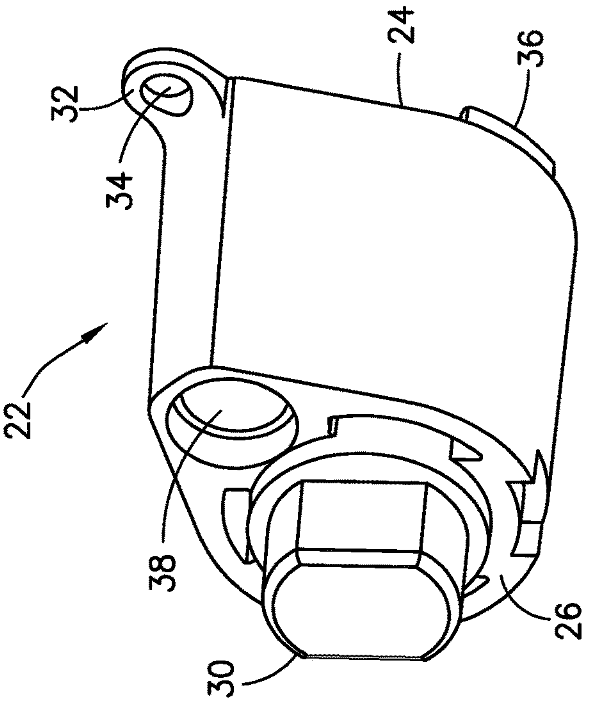
FIG. 4 is a top perspective view of the valve stem extension.
Figure 7:
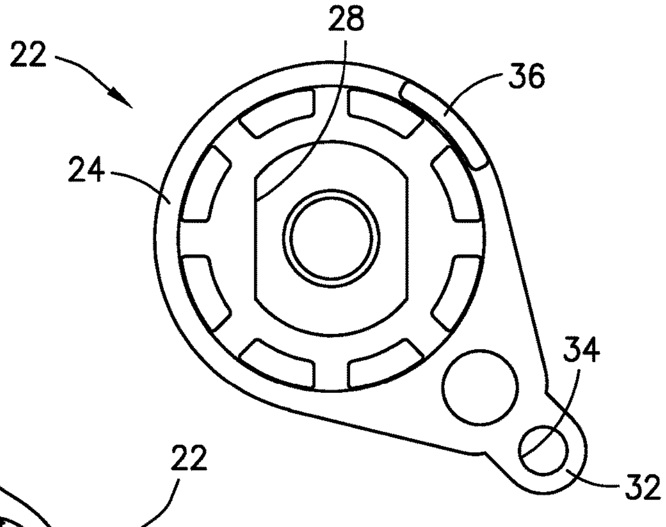
FIG. 7 is a bottom plan view of the valve stem extension of FIGS. 4-6.
Figure 8:
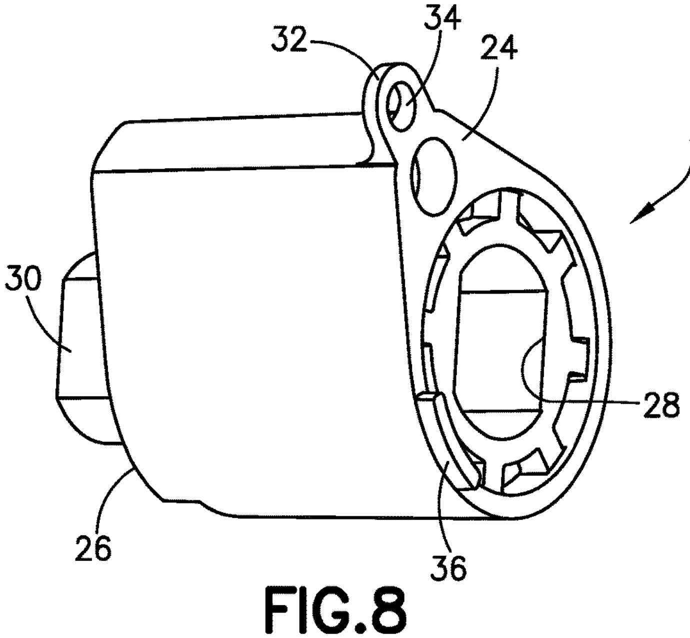
FIG. 8 is a bottom perspective view of the valve stem extension of FIGS. 4-7.
Figure 9:
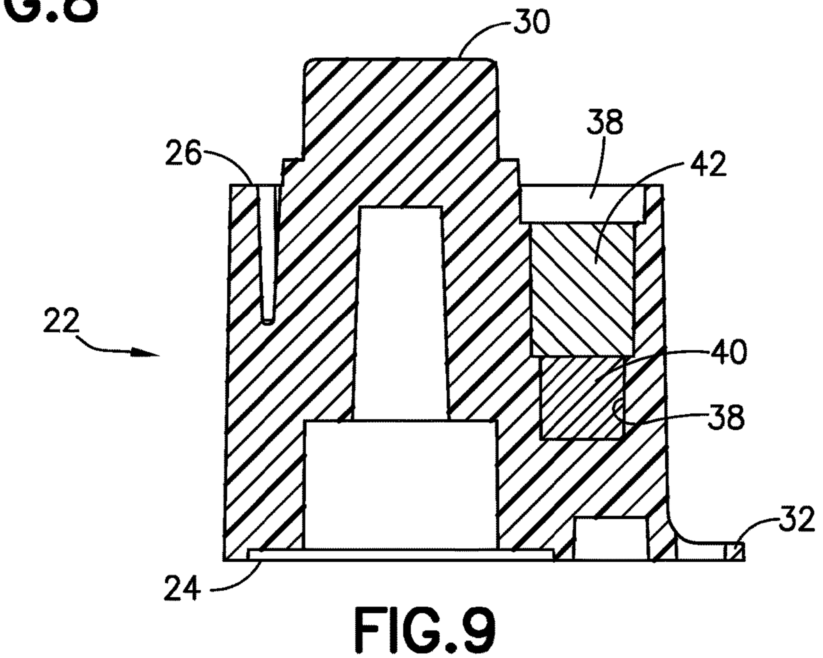
FIG. 9 is a cross-sectional view of the valve stem extension of FIG. 4-8.

The valve 10 is usable with a switch apparatus identified generally by the 20 in FIG. 3. The switching apparatus 20 includes a valve stem extension 22, as shown in detail in FIGS. 4-9 that can be mounted to the valve stem 17 of the valve 10 after the valve handle 18 has been removed from the valve stem 17. The properly mounted valve stem extension 22 extends farther from the valve body 12 than the valve stem 17. Additionally, the valve stem extension 22 is mounted to the valve stem 17 so that the valve stem extension 22 rotates in unison with the valve stem 17 about the axis of the valve stem 17. More particularly, the valve stem extension 22 has opposite bottom and top ends 24 and 26. The bottom end 24 of the valve stem extension 22 includes a noncircular recess 28 configured to mount over and frictionally engage a correspondingly configured noncircular projection 17A of the valve stem 17 on the valve 10. The top end 26 of the valve stem extension 22 includes a noncircular projection 30 with a shape corresponding to the shape of the projection 17A of the valve stem 17 of the valve 10. As a result, the handle 18 of the valve 10 that had been removed from the projection 17A of the valve stem 17 of the valve 10 can be mounted into frictional engagement with the noncircular projection 30 on the top end 26 of the valve stem extension 22 so that rotational forces applied to the handle 18 will cause corresponding rotation of the valve stem extension 22 and the valve stem 17 of the valve 10, along with corresponding movement of the valving element of the valve 10 between opened and closed positions in the valve body 12.

A locking tab 32 projects radially out from the valve stem extension 22 at a position adjacent the bottom end 24 of the valve stem extension 22. The locking tab 32 includes a locking hole 34 that can receive a projection or lock for releasably holding the valve stem extension 22 in a selected rotational position on the switch apparatus 20, as explained further below.

A rotation limiting tab 36 projects down from the bottom end 24 of the valve stem extension 22 and is engaged in a track, as explained below, to limit the amount of rotation of the valve stem extension 22 and the valve stem 17.

An opening 38 extends into the top end 26 of the valve stem extension 22 at a position aligned with the tab 32 in a plane that includes the rotational axis of the valve stem extension 22. A magnet 40 is positioned in the opening 38 and a seal 44 is mounted in a top part of the opening 38. The magnet 40 and the locking tab 32 are in a common radial plane extending out from the rotational axis of the valve stem extension 22. Thus, the magnet 40 and the locking tab 32 move with the rotation of the valve stem extension 22 about the rotational axis of the valve stem 17 and transcribe circular arcs due to the outward position of the magnet 40 and the locking tab 32 relative to the rotational axis of the valve stem 17 and the valve stem extension 22.

Figure 10:
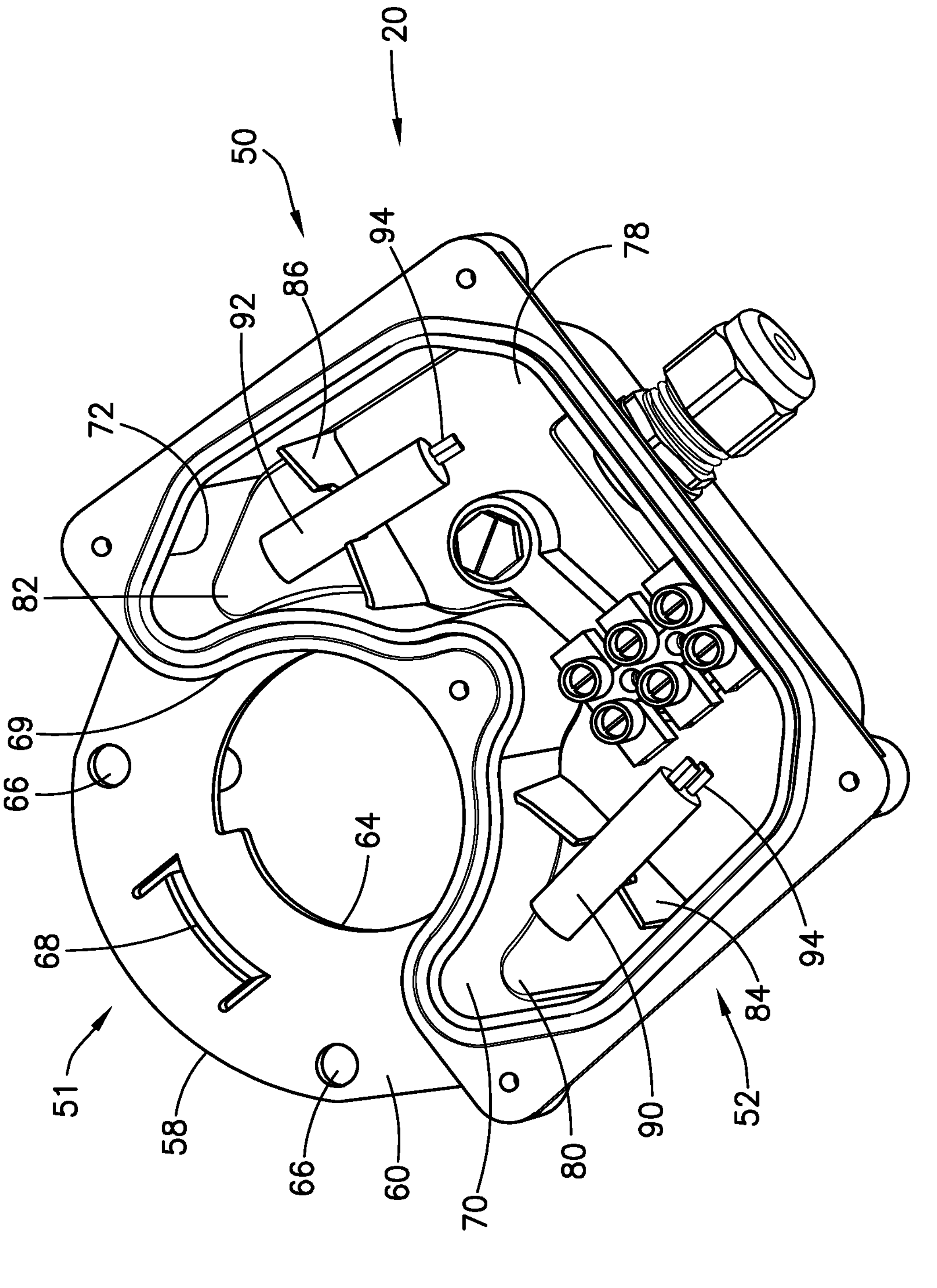
FIG. 10 is a perspective view of the switch housing of FIG. 3 prior to mounting a switch cover on the switch housing.
Figure 12:
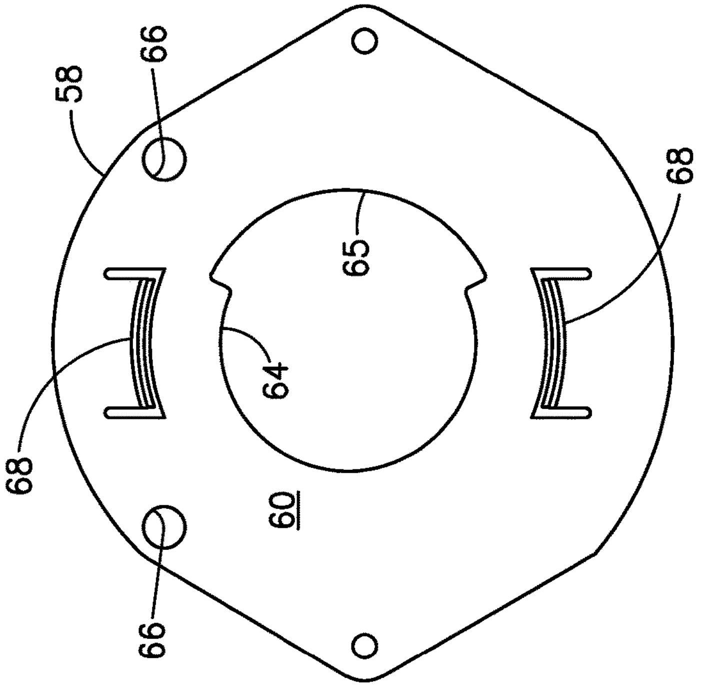
FIG. 12 is a top plan view of the switch platform of FIG. 11.
Figure 13:
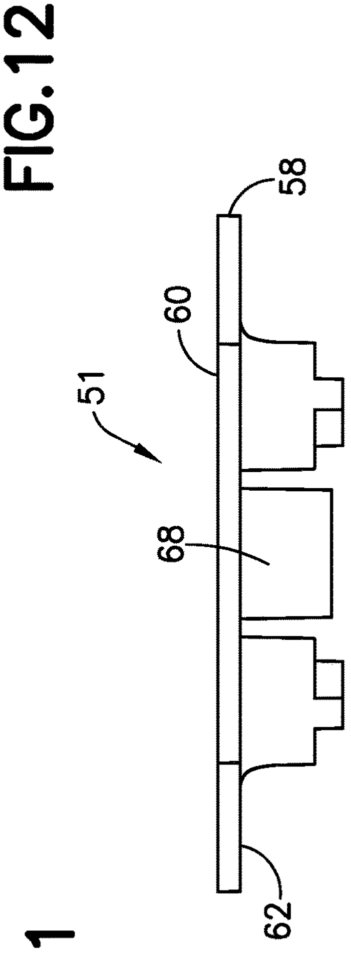
FIG. 13 is a side elevational view of the switch platform of FIGS. 11 and 12.
Figure 11:
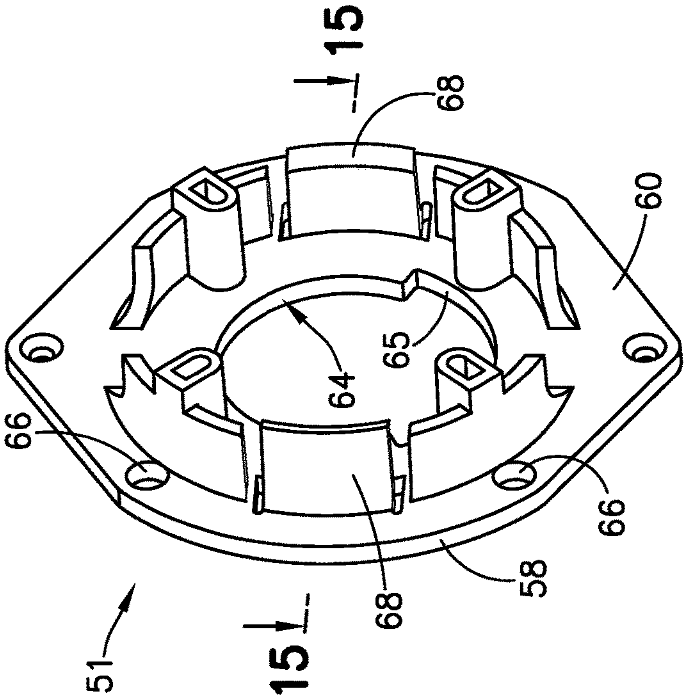
FIG. 11 is a perspective view of the switch platform of the switch apparatus shown in FIG. 3.
Figure 15:
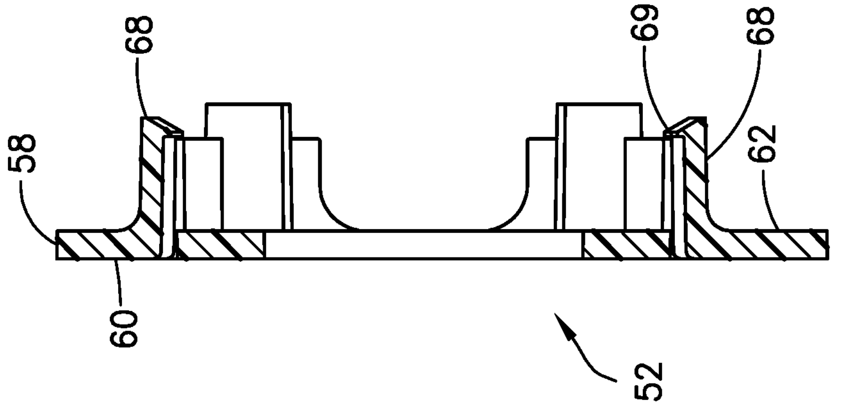
FIG. 15 is a cross-sectional view taken along line 15-15 of FIG. 11.
Figure 14:
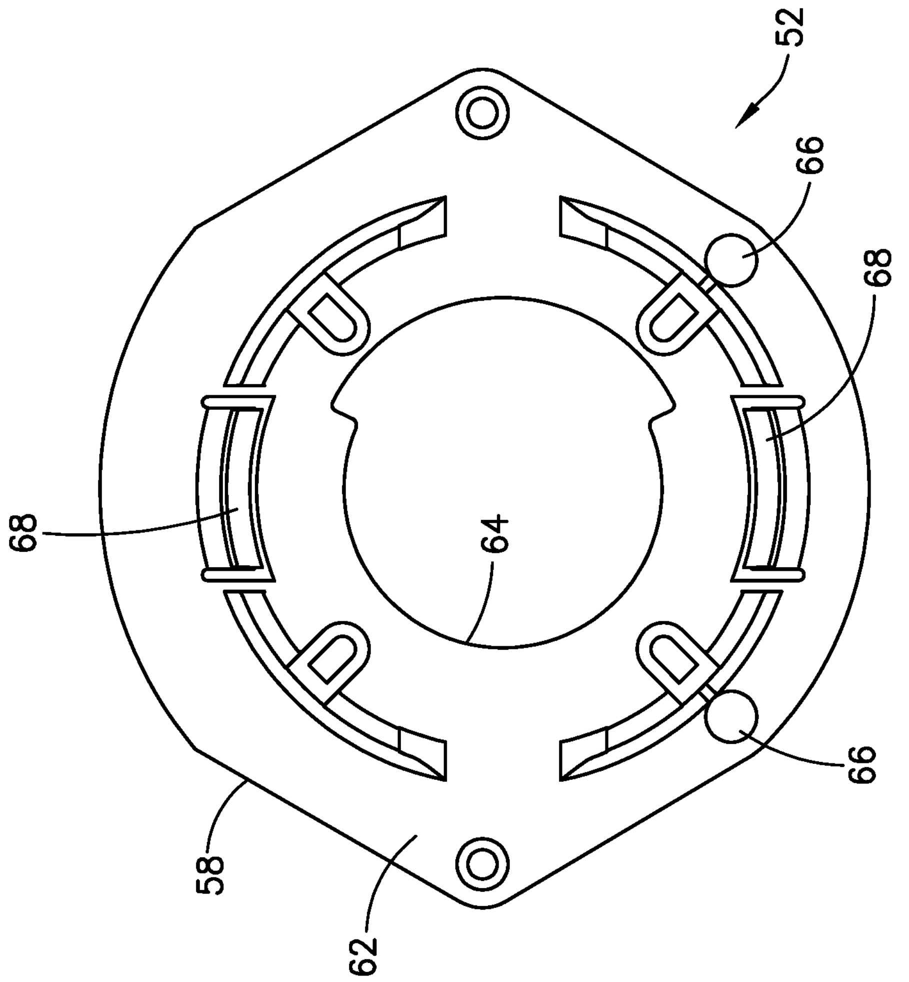
FIG. 14 is a bottom plan view of the switch platform of FIGS. 11-13.
Figure 17:
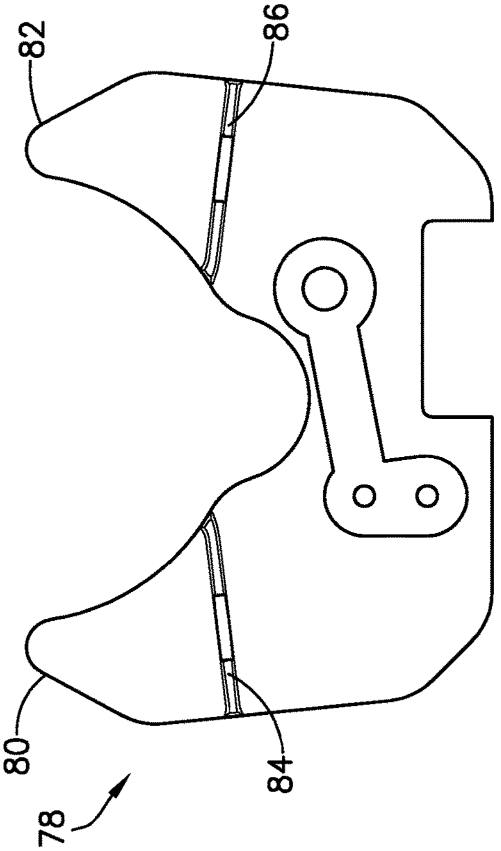
FIG. 17 is a top plan view of the inner plate of FIG. 16.
Figure 18:
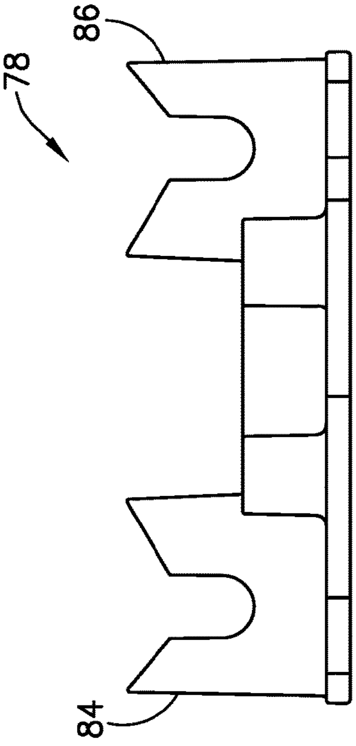
FIG. 18 is an end view of the inner plate of FIGS. 16 and 17.
Figure 16:
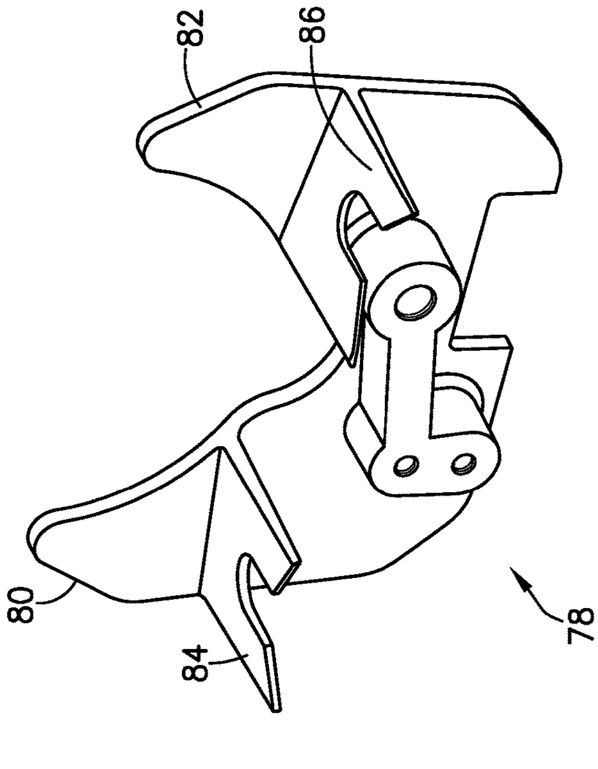
FIG. 16 is a perspective view of the inner plate of the switch housing of FIGS. 3 and 10.
Figure 19:
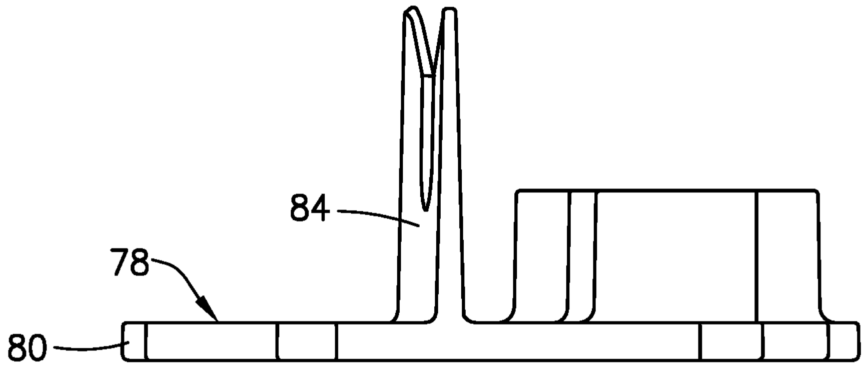
FIG. 19 is a side elevational view of the inner plate of FIGS. 16-18.

The switch apparatus 20 further includes a switch housing assembly 50 that is shown in FIGS. 3 and 10. The switch housing assembly 50 is mountable to the valve 10 after the valve handle 18 has been removed but, in this embodiment, before the valve stem extension 22 has been mounted to the valve stem 17. The switch housing assembly 50 is comprised of a switch platform 51, a switch receptacle 52 and a switch cover 54, all of which are molded from plastic in this embodiment. The switch receptacle 52 has a closed bottom wall 53, a continuous peripheral side wall 55 and an open top 56, as shown in FIG. 3. The switch receptacle 52 is formed separately from the switch platform 51 to facilitate molding of projections that extend down from the switch platform 51, as explained below. The switch cover 54 is configured to mount over and close the open top 56 of the switch receptacle 52. A seal 59 provides sealing between the upper end of the side wall 55 and the switch cover 54.

The switch platform 51 is the part of the switch housing assembly 50 that faces toward the valve body 12 when the switch housing assembly 50 is mounted to the valve 10. The switch platform 51 has an outer periphery 58 defining a larger footprint than either the switch cover 54 or the peripheral sidewall 55. The switch platform 51 has opposite top and bottom surfaces 60 and 62 and a valve stem opening 64 extends through the switch platform 51 from the top surface 60 to the bottom surface 62. The valve stem opening 64 is disposed to surround the valve stem 17 of the valve 10 when the switch housing assembly 50 is mounted on the flange 19 of the valve body 12 of the valve 10. The valve stem opening 64 includes an enlarged region that forms a track 65 that engages the rotation limiting tab 36 at the bottom end 24 of the valve stem extension 22 to limit the amount of rotation of the valve stem extension 22 and the valve stem 17. Locking holes 66 are formed through the switch platform 51 at positions outward from the valve stem opening 64. The locking holes 66 are dimensioned and disposed to align with the locking hole 34 in the locking tab 32 of the valve stem extension 22 in two opposite rotational positions of the valve stem extension 22, as explained further herein. Resiliently deflectable locks 68 project down from the bottom surface 62 of the switch platform 51 and have inwardly extending locking projections that are configured to snap into engagement with the flange 19 of the valve body 12 of the valve 10 after the valve handle 18 has been removed. Each locking projection has a leading end that is sloped to generate outward deflection of the lock 68 when mounting on the flange 19 of the valve body 12 and a locking surface that is perpendicular to an extending direction of the resiliently deflectable lock 68 for snapped engagement with the lower surface of the flange 19.

The switch receptacle 52 of the switch housing assembly 50 is mounted to portions of the upper surface 60 of the switch platform 51 and has a shape so that the valve stem opening 64 and the locking holes 66 are outside of the area enclosed by the peripheral sidewall 55. More particularly, the peripheral sidewall 55 circumscribes roughly one half of the valve stem opening 64 at a position spaced slightly outward from the valve stem opening 64. Thus, the outer surface of the peripheral sidewall 55 has a concave region 69 that partly surrounds the valve stem opening 64 in the switch platform 51. The inner peripheral region surrounded by the peripheral sidewall 55 has two concave regions 70 and 72 that are spaced outward from roughly diametrically opposed positions relative to the valve stem opening 64.

The cover 54 of the switch housing assembly 50 has a shape that generally conforms to the shape of the peripheral sidewall 55. Screws 74 are used to secure the cover 54 to a top end of the peripheral sidewall 55 and to secure the switch platform 52 to the bottom end of the peripheral sidewall 55.

An inner plate 78 is mounted in the switch receptacle 52 at a position inward of the peripheral sidewall 55 of the switch receptacle 52. The inner plate 78 is molded from resin and is configured, as shown. In FIGS. 10 and 16-19, to conform to the inner peripheral shape defined by the peripheral sidewall 55. Thus, the inner plate 78 includes projections 80 and 82 that project into and conform generally to the shapes of the concave regions 70 and 72 defined by the peripheral sidewall 55, as shown most clearly in FIG. 10. Reed switch holders 84 and 86 project up from the inner plate 78 at positions along the projections 80 and 82. Thus, the reed switch holders 84 and 86 will be at positions in the concave regions 70 and 72 of the peripheral sidewall 55 when the inner plate 78 is mounted to the switch platform 51 of the switch housing assembly 50. The reed switch holders 84 and 86 are generally U-shaped and include upwardly open receptacles for receiving reed switches 90 and 92 so that the magnetically operable portions of the reed switches 90 and 92 are at opposite sides of the valve stem opening 64 and at positions to be affected by the magnet 40 in the valve stem extension 22 in one of the two opposite rotational positions of the valve stem extension 22. The positions of the reed switches 90 and 92 are adjustable along their respective axial directions to align with rotational positions of the valve stem extension 22 at which the magnet 40 is positioned at the respective opened and closed positions of the valve 10.

Wires 94 are connected respectively to the reed switches 90 and 92 and extend from the reed switches 90 and 92 through a sealed opening 96 in the peripheral side wall 55 of the switch housing assembly 50. Ends of the wires 94 remote from the reed switches 90 and 92 can be connected to a monitoring circuit for detecting the position of the valving member as explained herein.

The assembly is used simply by removing the valve handle 18 from the valve stem 17, mounting the switch housing assembly 50 to the valve body 12 so that the valve stem opening 64 in the switch platform registers with the valve stem 17 of the valve 12. The locking projections 68 that project from the bottom surface of the switch platform 51 snap into engagement with the lower surface 19A of the flange 19 of the valve body 12 merely by pushing the switch housing assembly 50 linearly toward the flange 19 of the valve housing 12 parallel to the rotational axis of the valve stem 17. The valve stem extension 22 then is telescoped onto the noncircular extension 17A of the valve stem 17 from which the valve handle 18 had been removed. The engagement of the valve stem extension 22 with the noncircular extension 17A of the valve stem 17 can be completed without using tools and is based on the frictional engagement of the noncircular recess 28 in the bottom end 24 of the valve stem extension 22 with the noncircular extension 17A of the valve stem 17. The valve handle 18 then is mounted to the noncircular projection 30 on the top end 26 of the valve stem extension 22 and opposite the valve stem 17 of the valve 10. Thus, rotational forces exerted on the valve handle 18 will cause both the valve stem extension 22 and the valve stem 17 to rotate, thereby changing the valving member between the opened and closed positions depending upon the direction and magnitude of rotation. The assembly of the valve 10 and the switch apparatus 20 can be incorporated into a piping system that is under construction or that is being revised or expanded. The wires 94 extending from the reed switches 90 and 92 and through the sealed opening in the switch housing 50 are connected to appropriate monitoring circuitry.

Rotation of the valve handle 18 will cause the valve stem extension 22 and the valve stem 17 to rotate in unison. This rotation of the valve stem extension 22 will cause the magnet 40 embedded in the valve stem extension 22 to transcribe an arc that will position the magnet 40 near one of the two reed switches 90 or 92 depending upon the direction of rotation of the valve handle 18. Thus, one of the two reed switches 90 or 92 will be triggered to produce a signal corresponding to either the opened position or the closed position of the valve 10.

The preceding description describes the assembly of a valve 10 with the switch apparatus 20 to form an assembly that can be incorporated into a piping system that is under construction. However, the switch apparatus 20 described above can be incorporated into an existing piping system without disassembling or shutting down any part of the existing piping system except for the simple manual temporary removal of the valve handle 18 from the valve stem 17 of the valve 10 to which the switch apparatus 20 will be mounted. In this regard, a worker merely needs to remove the valve handle 18 from a valve that is part of an existing piping system. The switch housing assembly 50 then is mounted to the valve body 12 so that the valve stem opening 64 of the switch platform 51 of the switch housing assembly 50 aligns with the existing valve stem 17. The entire switch housing assembly 50 then snaps into engagement with the flange 19 of the valve body 12. The valve stem extension 22 then is mounted to the noncircular extension 17A at the outer end of the valve stem 17. The original valve handle 18 then is mounted to the projection 30 at the top end 26 of the valve stem extension 22 opposite the original valve stem 17. Significantly, the mounting of the switching apparatus 20 to the valve 10 does not require any disassembly of the valve 10 other than the temporary removal of the valve handle 18 from the valve 10. No part of the piping system that incorporates the valve 10 is required to be brought off-line during the mounting of the switching apparatus 20 to the existing valve 10 in the existing piping system.

Figure 20:
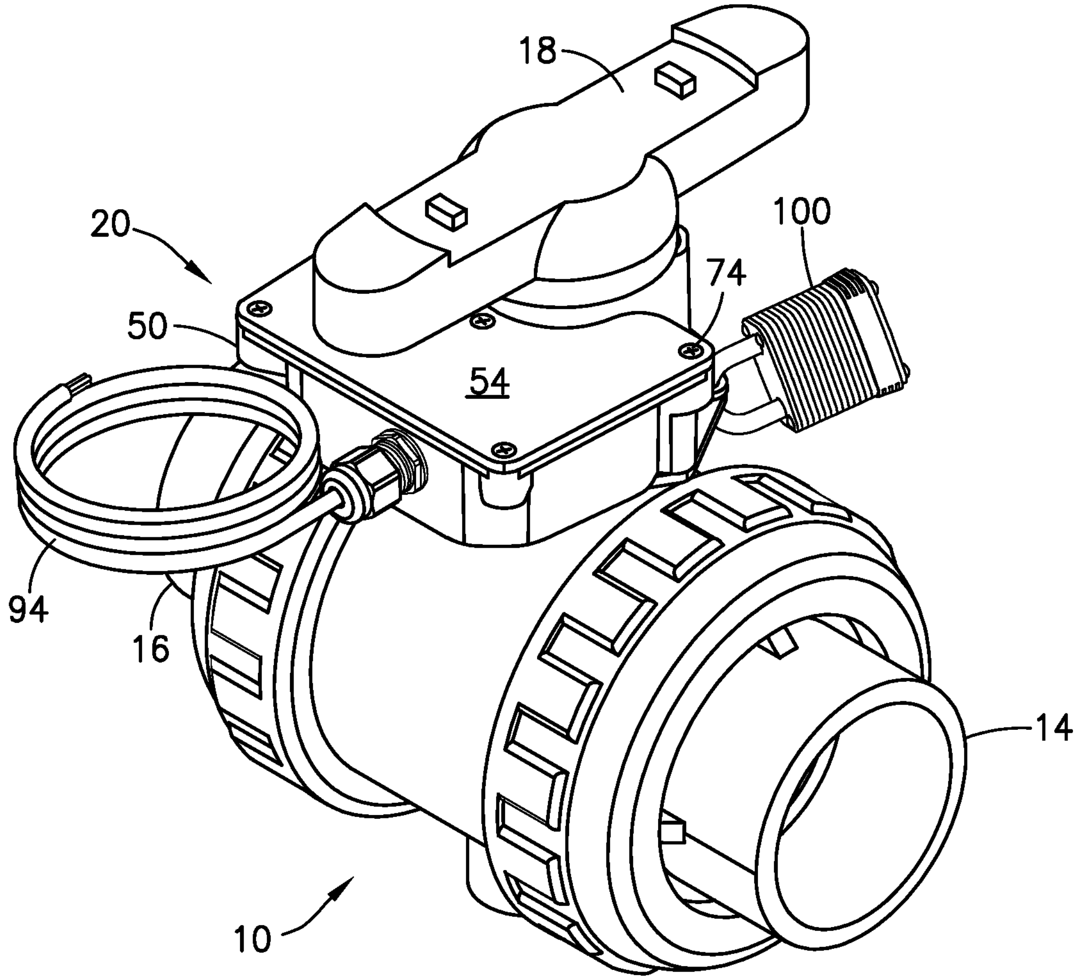
FIG. 20 is a perspective view of the switch apparatus assembled with the ball valves of FIGS. 1 and 2.

The valve stem extension locking hole 34 of the valve stem extension 22 will align with the first housing locking hole 66 when the valve stem extension 22 is in the first rotational position and the valve stem extension locking hole 34 of the valve stem extension 22 will align with the second housing locking hole 66 when the valve stem extension 22 is in the second rotational position. A lock 100 can be used, as shown in FIG. 20, to lock the valve stem extension 22 in one of the first or second rotational positions, as shown in FIG. 20.

While the invention has been described with respect to certain preferred embodiments, it is understood that the scope of the invention is not limited to these embodiments. For example, the side wall enclosure 56 and the inner plate 78 can be configured to mount the reed switches 90 and 92 at positions for identifying orientations of the valving element other than the completely opened or completely closed positions. A two-way ball valve has been described and illustrated. However, a three-way ball valve, a butterfly valve or other valves can be used with the switch apparatus 20 by possibly making minor changes to the shape of the switch housing assembly 50 to accommodate the shape of the valve housing and the stop positions of the valve stem or to change the spacing of the switch housing assembly 50 from the valve body 12 or the longitudinal extension of the valve stem extension 22. Furthermore, more than two rotational positions of the valve stem extension can be sensed by providing more than two position or proximity sensors. This latter feature may be useful for some three-way ball valves, for example. The reed switches illustrated above can be replaced by other sensors, such as Hall effect sensors, electro-optical sensors or manual contact sensors.

The invention claimed is:

1. A valve monitoring apparatus for a valve that has a valve body, a valve stem with a mounting portion projecting out of the valve body, the valve body further having a flange projecting radially outward relative to the valve stem, and the valve further having a valve handle mounted removably to the mounting portion of the valve stem, the valve monitoring apparatus comprising:

a valve stem extension having opposite first and second ends spaced apart along a rotational axis of the valve stem extension, the first end of the valve stem extension removably and non-rotatably engaging the mounting portion of the valve stem upon removal of the valve handle from the mounting portion of the valve stem so that rotation of the valve stem extension rotates the valve stem, a magnet mounted to the valve stem extension at a position radially outward of the rotational axis of the valve stem extension; and a switch housing assembly that has resiliently deflectable latches that snap into releasable engagement with the flange on the valve body as the switch housing is pushed linearly toward the valve body along a direction parallel to the rotational axis of the valve stem, the switch housing assembly including a switch receptacle having a closed bottom wall and a side wall extending integrally up from the bottom wall, the side wall having an outwardly concave portion extending circumferentially around a portion of the valve stem extension and at a position spaced radially outward from the valve stem extension, the switch receptacle further including at least one proximity sensor that generates a signal when the valve stem extension is rotated into a rotational position for the magnet to align with the at least one proximity sensor and thereby generating at least one signal indicative of at least one rotational position of the valve stem extension, a switch cover mounted and sealed to an end of the side wall opposite the bottom wall so that the at least one proximity sensor is sealed in the switch housing assembly.

2. The valve monitoring apparatus of claim 1, wherein the at least one proximity sensor comprises first and second proximity sensors located respectively at first and second positions in the switch receptacle, the first proximity sensor generating a first signal when the valve stem extension is rotated into a first rotational position where the magnet aligns with the first proximity sensor and the second proximity sensor generating a second signal when the valve stem extension is rotated into a second rotational position where the magnet aligns with the second proximity sensor.

3. The valve monitoring apparatus of claim 2, wherein the first and second proximity sensors are adjustably mounted in the switch receptacle.

4. The valve monitoring apparatus of claim 2, wherein the first and second proximity sensors are at positions corresponding to an approximately 85° to 90° rotation of the valve stem extension.

5. The valve monitoring apparatus of claim 2, wherein a valve stem extension locking hole is formed in proximity to the first end of the valve stem extension and the switch housing assembly is formed with at least one switch platform locking hole disposed to align with the valve stem extension locking hole when the valve stem extension is in the at least one rotational position.

6. The valve monitoring apparatus of claim 5, further comprising a lock selectively engaged in the valve stem extension locking hole and with the at least one switch platform locking hole for selectively locking the valve stem extension in one of the first and second rotational positions.

7. The valve monitoring apparatus of claim 1, wherein the at least one proximity sensor is at least one reed switch.

8. The valve monitoring apparatus of claim 1, wherein the switch housing assembly has a switch platform that faces toward the valve body, the switch platform being formed with a valve stem opening that surrounds the valve stem, the valve stem opening including a track that receives a rotation limiting tab projecting from the valve stem extension to limit a rotation amount of the valve stem extension and the valve stem.

9. The valve monitoring apparatus of claim 1, wherein the second end of the valve stem extension is configured for non-rotatably engaging the valve handle.

10. A method for providing a monitoring capability to a manual valve, the manual valve having a valve body, a valve stem mounted in the valve body and having a mounting portion projecting out of the valve body in a projecting direction, the valve body further having a flange projecting radially outward relative to the valve stem, the flange having a locking surface facing opposite from the projecting direction of the valve stem, the valve stem being rotatable about a rotational axis and the manual valve further having a valve handle mounted removably to the mounting portion of the valve stem, the method comprising:

removing the valve handle from the valve stem;

providing a switch housing assembly that has resiliently deflectable latches that extend in a mounting direction for mounting the switch housing to the valve body, each of the latches having a sloped leading end that is sloped relative to the mounting direction and a locking surface facing oppositely from the mounting direction;

mounting the switch housing assembly to the valve body linearly in the mounting direction so that the sloped leading ends of the resiliently deflectable latches of the switch housing assembly engage the flange of the valve body and generate outward deflection of the resiliently deflectable latches and so that, after sufficient linear movement of the switch housing toward the valve body, the locking surfaces of the latches align with the locking surface of the flange and the latches resiliently return inwardly to a position where the locking surfaces of the latches engage the locking surface of the flange, the switch housing assembly having at least first and second sensors spaced outward from the rotational axis of the valve stem and circumferentially spaced from one another about the rotational axis of the valve stem;

mounting a first end of a valve stem extension to the valve stem so that rotation of the valve stem extension generates corresponding rotation of the valve stem, the valve stem extension having a magnet configured for actuating the first sensor in a first rotational position of the valve stem extension and for actuating the second sensor in a second rotational position of the valve stem extension; and mounting the valve handle to an end of the valve stem extension opposite the valve stem.

11. The method of claim 10, further comprising connecting the first and second sensors to a monitoring circuit that identifies which of the sensors is actuated.

12. The method of claim 10, wherein the first and second sensors are reed switches and the sensor actuator is a magnet.

13. A valve monitoring apparatus for a valve that has a valve housing, a valve stem mounted partly in the valve housing and having a mounting portion projecting out of the valve body, the valve stem being rotatable about a rotational axis, the valve monitoring apparatus comprising:

a valve stem extension having opposite first and second axial ends, the first axial end of the valve stem extension removably and non-rotatably engaging the mounting portion of the valve stem so that rotation of the valve stem extension between first and second rotational positions causes corresponding rotation of the valve stem, a magnet mounted to the valve stem extension at a position radially outward of the rotational axis of the valve stem so that rotation of the valve stem extension moves the magnet between first and second magnet positions; and a switch housing assembly releasably mounted to the valve housing at positions spaced outward from the valve stem extension in directions perpendicular to the rotational axis of the valve stem, the switch housing assembly including a switch receptacle having a bottom wall and a continuous peripheral side wall extending from the bottom wall and a switch cover mounted to an end of the peripheral side wall of the switch receptacle to define a sealed switch enclosure, the peripheral side wall of the switch receptacle having an outwardly concave region nested with the valve stem extension and permitting rotation of the valve stem extension between the first and second rotational positions, first and second magnetically operable switches being mounted in the sealed switch enclosure at positions circumferentially spaced from one another relative to the rotational axis of the valve stem so that the magnet operates the first magnetically operated switch when the valve stem extension is in the first rotational position and so that the magnet operates the second magnetically operated switch when the valve stem extension is in the second rotational position.

14. The valve monitoring apparatus of claim 13, wherein the first and second magnetically operable switches are adjustably mounted in the sealed switch enclosure of the switch housing assembly.

15. The valve monitoring apparatus of claim 13, wherein the first and second magnetically operable switches are at positions corresponding to an approximately 85° to 90° rotation of the valve stem extension.

16. The valve monitoring apparatus of claim 13, wherein the magnetically operable switches are reed switches.

17. The valve monitoring apparatus of claim 13, wherein the switch housing assembly has a switch platform that faces toward the valve body, the switch platform being formed with a valve stem opening that surrounds the valve stem, the valve stem opening including a track that receives a rotation limiting tab projecting from the valve stem extension to limit a rotation amount of the valve stem extension and the valve stem.

18. The valve monitoring apparatus of claim 17, wherein the switch receptacle has a bottom wall mounted to the switch platform at positions offset from the valve stem opening in the switch platform, the peripheral side wall extending from the bottom wall in a direction away from the switch platform, the switch cover being mounted to an end of the peripheral side wall remote from the switch platform.

19. The valve monitoring apparatus of claim 13, wherein the valve body has a flange projecting radially outward relative to the valve stem, and the switch housing assembly has resiliently deflectable latches configured to snap into releasable engagement with the flange on the valve body as the switch housing is pushed linearly toward the valve body along a direction parallel to the rotational axis of the valve stem.

* * * * *